US006415986B1

(12) United States Patent
Yokomizo

(10) Patent No.: US 6,415,986 B1
(45) Date of Patent: Jul. 9, 2002

(54) HEAT SUPPLY SYSTEM

(75) Inventor: Osamu Yokomizo, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/932,917

(22) Filed: Aug. 21, 2001

(30) Foreign Application Priority Data

Feb. 1, 2001 (JP) ........................................ 2001-025308

(51) Int. Cl.$^7$ ............................................... F24D 3/00
(52) U.S. Cl. ......................... 237/8 A; 237/2 A; 236/94
(58) Field of Search .................................. 237/8 A, 8 B, 237/8 R, 2 A; 236/94; 374/41, 42

(56) References Cited

U.S. PATENT DOCUMENTS

| | | | | |
|---|---|---|---|---|
| 4,509,679 A | * | 4/1985 | Longini | 236/94 |
| 4,591,988 A | * | 5/1986 | Klima et al. | 165/11.1 |
| 4,782,888 A | * | 11/1988 | Bardenheier | 165/11.1 |
| 5,502,339 A | * | 3/1996 | Hartig | 307/31 |
| 5,646,858 A | * | 7/1997 | Schrock et al. | 165/11.1 |
| 5,730,356 A | * | 3/1998 | Mongan | 237/12.3 C |
| 5,805,856 A | * | 9/1998 | Hanson | 165/287 |
| 5,937,940 A | * | 8/1999 | Davis et al. | 165/202 |
| 5,971,287 A | * | 10/1999 | Kettner et al. | 165/230 |

FOREIGN PATENT DOCUMENTS

JP 2000-45869 2/2000

* cited by examiner

Primary Examiner—Harold Joyce
Assistant Examiner—Derek S. Boles
(74) Attorney, Agent, or Firm—Mattingly, Stanger & Malur, P.C.

(57) ABSTRACT

In a system for supplying a heat by a heat medium, a heat discharged from a customer requiring only a high temperature heat is effectively utilized, and respective prices paid by the customer requiring only the high temperature heat and a customer requiring only a low temperature heat are reduced. In this system, a heat medium discharged by the customer requiring only the high temperature heat is recovered so as to be fed to the customer requiring only the low temperature heat. At this time, a temperature, an amount of flow and the like of the heat medium at an access port of the customer are measured by measuring devices, an amount of heat used by the customer is comprehended, a unit value of the amount of heat is set to be higher in accordance that an arithmetic average of a specific enthalpy of the heat medium at the access port of the customer is higher, and a unit value of the amount of heat of the customer that does not recover the heat medium is set on the basis of an arithmetic average of a specific enthalpy of the heat mediums between at the access port and at a normal temperature and a normal pressure.

4 Claims, 8 Drawing Sheets

HEAT SUPPLY SYSTEM

BACKGROUND OF THE INVENTION

1. Field of the Invention

The present invention relates to a heat supply system which supplies an exhaust heat of a power generating equipment employing a fossil fuel or a heat generated by directly burning the fossil fuel to a commercial building, a factory, a house or the like (hereinafter, refer to a customer) and obtains a price.

2. Description of Prior Art

In a conventional heat supply system, the heat is supplied to the customer in the form of a vapor or a hot water, and the price is calculated in correspondence to an amount of the vapor or the hot water.

In this case, an application of the heat is different in the kind of the customer, that is, there are various cases including a case of a chemical process or the like requiring a high temperature, a case of a food sterilization requiring a heat about 100° C., and a case of a heating or the like requiring a heat about some tens ° C. Further, there is a customer requiring the vapor or the hot water corresponding to the heat medium itself in addition to the heat, however, there is a customer requiring only the heat within a certain temperature range and requiring no heat medium having a lower temperature than the certain temperature range for the reason of the heat usage. In the case of the vapor, there is a case that a high pressure is required in addition to the temperature, however, there is a customer that can not use the medium having the reduced pressure due to the use even when the medium has a certain high level temperature. In this case, in accordance with the conventional system, the heat medium which does not reach the necessary pressure or temperature range is wasted in a state that an energy is not effectively utilized.

Further, although an expensive equipment is required for the purpose of producing the vapor having a high temperature and a high pressure so as to supply to the customer, an equipment for producing low-temperature hot water is not so expensive. However, in the system for supplying the vapor to the customer requiring the vapor having the high temperature or the high temperature and high pressure, the heat having an overvalued cost is also supplied to the customer requiring only the heat having a low temperature. If a unit price per an amount of heat is set to be the same as that of the customer requiring the high temperature and high pressure, the customer requiring only the low temperature heat buys the overvalued heat, and conversely, if the heat having the low temperature is set to be inexpensive, it is disadvantageous to recover the equipment.

SUMMARY OF THE INVENTION

An object of the present invention is to provide a heat supply system which is preferable for effectively utilizing an energy and supplying heat having a more inexpensive cost to a customer requiring various kinds of temperatures and pressures.

The object mentioned above can be achieved by recovering a heat medium after being used by a customer requiring heat having a high temperature range so as to use as a heat source for supplying a heat to a customer requiring a heat having a lower temperature range, and calculating a unit price of an amount of heat by a temperature and an amount of flow.

In this case, with respect to the customer recovering the heat medium, the unit price of the amount of heat is set to be higher in accordance that an arithmetic average between a specific enthalpy (h) of the heat medium supplied to the customer and a specific enthalpy ($h_L$) of the medium discharged from the customer is higher, and with respect to the customer recovering no heat medium, the unit price of the amount of heat is set to be higher in accordance that an arithmetic average between a specific enthalpy (h) of the heat medium supplied to the customer and a specific enthalpy ($h_O$) of the medium at normal temperature and normal pressure is higher.

DESCRIPTION OF THE PREFERRED EMBODIMENTS

A description will be given below of embodiments in accordance with the present invention with reference to the accompanying drawings.

Figure 1:
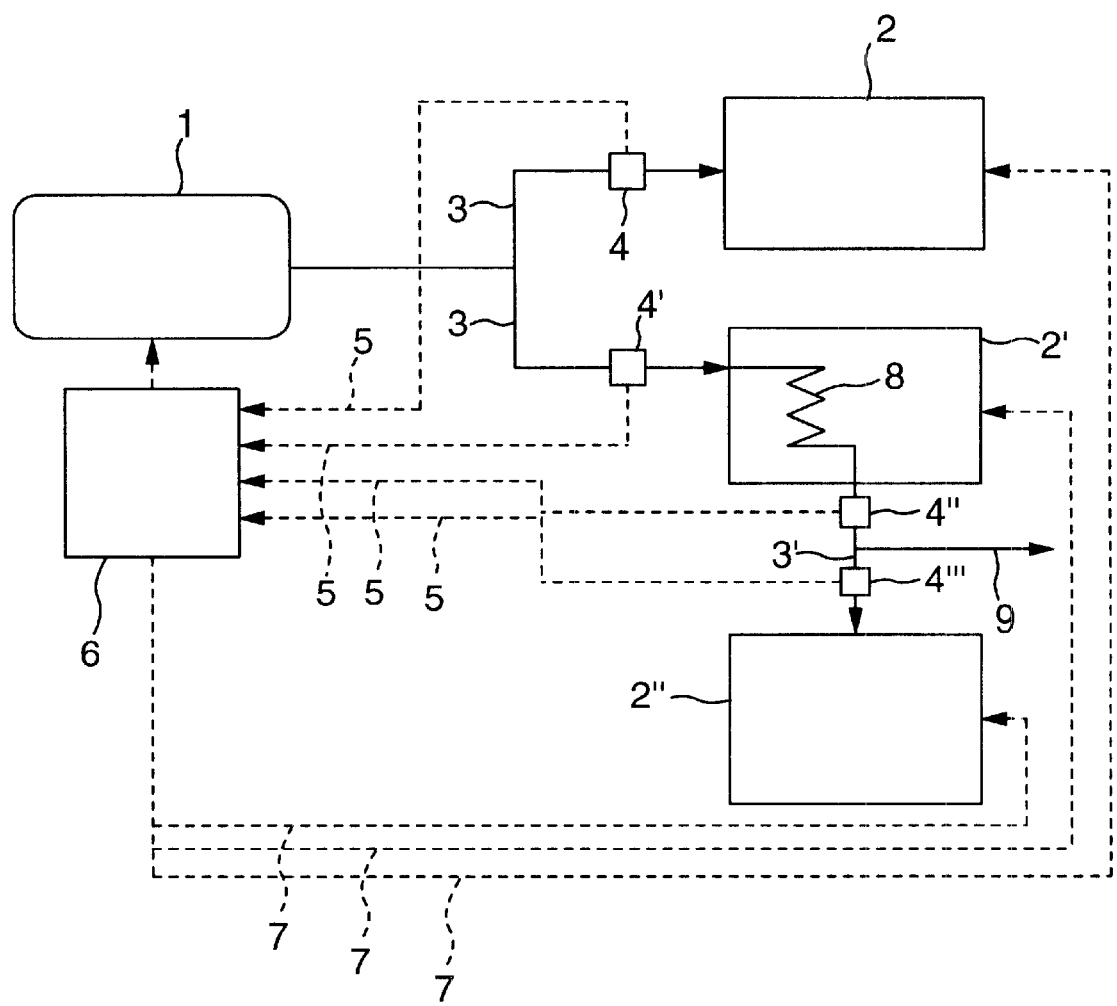
FIG. 1 is a schematic view of a first embodiment of a heat supply system in accordance with the present invention.

FIG. 1 shows a first embodiment of a heat supply system in accordance with the present invention. The present embodiment corresponds to a case that a heat is supplied to a customer 2 requiring a medium having a high temperature, for example, vapor, a customer requiring mainly requiring only heat having a high temperature and a customer 2" requiring heat having a low temperature. Of course, a number of the customers is not limited to three.

A heat supply apparatus 1 is provided with means for heating a medium, for example, a boiler, and generates a vapor. An amount of flow of the vapor supplied to each of the customers is controlled by a valve or the like in the customer sides. The generated vapor is fed to the customers 2 and 2' by pipes 3. The customer 2' uses only a heat within a high temperature range in a heat application system 8, and discharges the medium having the reduced temperature from a pipe 3'. The vapor becomes vapor having a lower temperature or a hot water after being used so as to be discharged. In order that the discharged medium is used, for example, for warming, drying and the like, the discharged medium is fed to the customer 2" requiring the heat having the low temperature. A surplus medium is returned to the heat supply apparatus 1 through a pipe 9. Measuring devices 4, 4', 4" and 4'" measure a temperature, a pressure, an amount of flow and the like of the medium, and send measured results to a measure-ment control apparatus 6 through a communicating means 5. The measurement control apparatus 6 is provided, for example, with a computer, calculates an amount of heat used by each of the customers on the basis of the measured results, calculates a price on the basis of the temperature and the pressure of the medium supplied to the customers, and notifies the customers by a communicating means 7. Further, the measurement control apparatus 6 controls an amount of heat generation in the heat supply apparatus 1 on the basis of the measured results. The communicating means 5 and 7 may employ a popular communicating means such as a wireless telephone, a general telephone line and a PHS, or may employ a private communication line disposed along the pipe or a power line carrier technology.

A heat source of the heat supply apparatus 1 may employ an exhaust heat of the power generation using a heat engine, a natural energy or the like, or may employ the heat generated by the other firm as a part of the heat source, in which case the cost for generating the heat is reduced.

Next, a description will be given of a method of calculating the amount of heat used by each of the customers.

With respect to the customers 2 and 2''', since the heat is consumed together with the medium itself, a consumed amount of the heat is calculated only on the basis of the temperature, the pressure and the amount of flow measured by the measuring devices 4 and 4''', respectively, however, with respect to the consumer 2', a consumed amount of the heat is calculated on the basis of a difference between a heat inflow amount calculated on the basis of the temperature, the pressure and the amount of flow measured by the measuring device 4' and a heat outflow amount calculated on the basis of the temperature, the pressure and the amount of flow measured by the measuring device 4".

A description will be given below of a case that the heat supply apparatus 1 generates the vapor with reference to an example of a method of calculating an amount of heat. In the vapor, the water or the mixture thereof, when a pressure P, a temperature T and a mixing ratio are determined, an amount of heat per a unit weight, that is, a specific enthalpy is determined. This is expressed by h(P, T) (kcal/kg). Further, measured values of the temperature, the pressure and the amount of flow in each of the measuring devices are expressed by T4, P4 and W4 or T4', P4' and W4'. Further, an atmospheric pressure is expressed as $P_0$, and a normal water temperature in the subject area as $T_0$.

With respect to the consumer 2, a consumed amount of heat $Q_2$ is given by the following formula.

$$Q_2 = \{h(P_4, T_4) - h(P_0, T_0)\} W_4 \quad (1)$$

With respect to the consumers 2' and 2''', consumed quantities of heat $Q_2'$ and $Q_2'$ are given by the following formulas.

$$Q_2' = \{h(P_4', T_4') - h(P_0, T_0)\} W_4' - \{h(P_{4''}, T_{4''}) - h(P_0, T_0)\} W_4'' \quad (2)$$

$$Q_2''' = \{h(P_4''', T_4''') - h(P_0, T_0)\} W_4''' \quad (3)$$

In the case that the temperature T is higher than a saturation temperature of the pressure P, since all the contents are vapor, h(P, T) coincides with the specific enthalpy hs(P, T) of the vapor, and in the case that it is lower, since all the contents are water, it coincides with the specific enthalpy hw(P, T) of the water, however, in the case that the temperature T is just the saturation temperature of the pressure P, since the contents become the mixture of the water and the vapor, a true amount of heat can be known only when a ratio between the water and the vapor in each of the measuring devices is known. In accordance with one way, the measuring device is provided with a function of separating the water from the vapor and measuring respective flow amount. When the ratio of flow amount of the vapor to the total flow amount measured by this way is set to β, it is possible to calculate in accordance with the formula (4).

$$h(P, T) = \beta hs(P, T) + (1-\beta) hw(P, T) \quad (4)$$

However, since the equipment for measuring the rate of the vapor becomes expensive, it is possible to assume in advance the value β of the medium discharged on the basis of a contract with the consumer 2 as 0, 1 or a certain middle value therebetween, in accordance with one way.

Further, since a condensed water does not normally flow together with the vapor and is recovered or wasted as a drain, in many cases, only the vapor comes out to the discharge port or conversely, all the vapor is condensed in the heat application system 8 and comes out as the water. In these cases, it can be dealt with as only the vapor or only the water. Further, there is a case that the consumer side separates only the vapor so as to discharge or the consumer having a very low rate of the vapor mixes the water and discharges by forming only the water.

Next, a description will be given of a method of calculating a price per an amount of heat (herein-after, refer to a unit value).

In accordance with the present heat supply system, even in the case of making the unit value constant without reference to the temperature, the amount of heat for the consumer 2' is quite for the consumed amount which is a second term in a right side of the formula 2 less than the conventional way, thereby obtaining an advantage. Further, since the customer 2''' can utilize the heat which is conventionally wasted, it is effective in view of an energy saving.

However, if the conventional state is kept, the consumer 2''' can not obtain an advantage. Accordingly, the unit value of the customer 2' is made higher and the unit value of the customer 2''' is made lower. In this case, if the unit value of the customer 2' is equal to or less than the value (an original unit value X (times) an amount of heat consumed by conventional system ÷ an amount of heat consumed by present system), the price paid by the customer 2' is reduced and the advantage can be maintained. Further, the customer 2''' can obtain the advantage in correspondence of the reduction of the unit value.

For example, when the unit value of the amount of heat is set so as to be higher in any one having a higher arithmetic average between the specific enthalpy supplied to the customer and the specific enthalpy discharged therefrom, the unit value for the customer using only the high temperature range becomes higher than that for the customer using between the high temperature range and the low temperature range, and the unit value for the customer using only the low temperature range becomes lower than that for the customer using between the high temperature range and the low temperature range.

Figure 2:
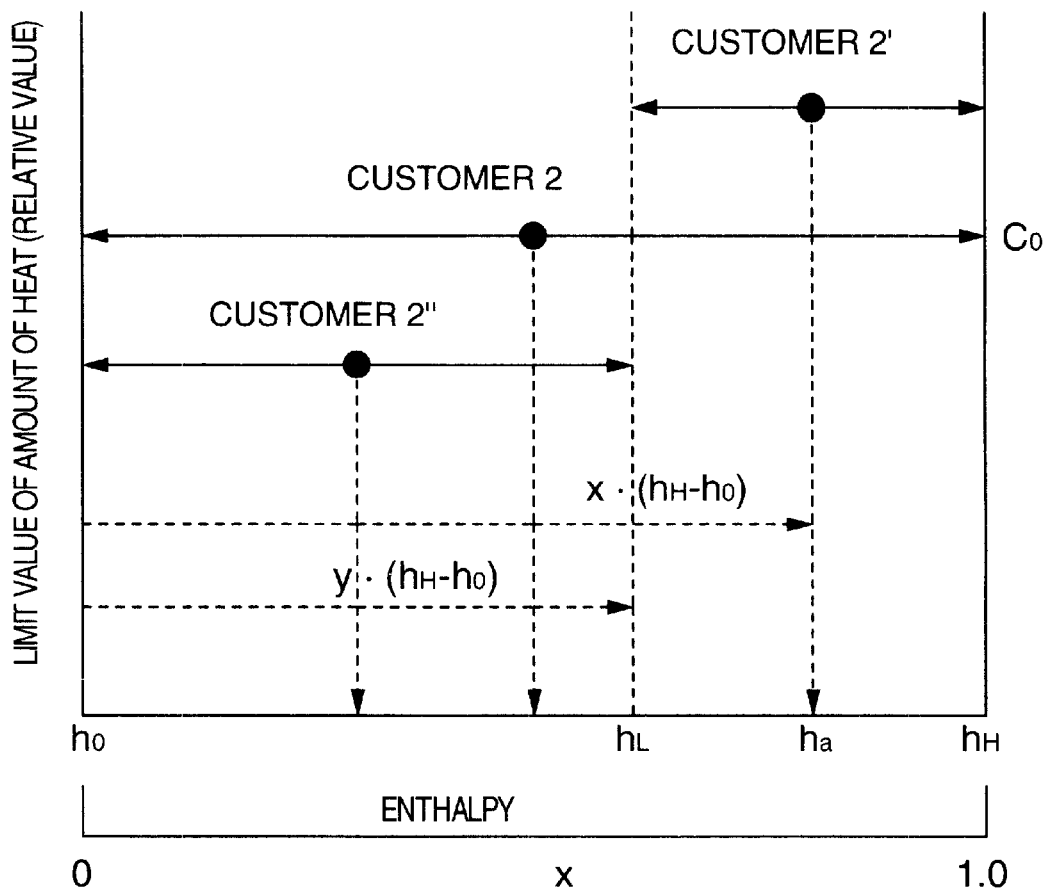
FIG. 2 is a conceptional view explaining a method of determining a unit cost of an amount of heat in accordance with the present invention.

As shown in FIG. 2, when setting the specific enthalpy of the present heat supply system to $h_H$ and setting the specific enthalpy of the water under the atmospheric pressure and the normal temperature to ho, the consumer 2' requires only the heat within the range of the temperature and the pressure between the specific enthalpies $h_H$ and $h_L$, and the quantities of flow $W_4'$ and $W_4''$ at an access port are the same. The unit value of the amount of heat is set to $C(h_A)$ as a function of the specific enthalpy $h_A$ of the arithmetic average at the access port and the unit value of hH and $h_0$ with respect to the average is set so as to coincide with the unit value in accordance with the conventional way, the price paid by the customer 2' in accordance with the conventional way is obtained by the formula 5.

$$C((h_H+h_0)/2)\times(h_H-h_0)\times W_4' \qquad (5)$$

On the other hand, the price paid by the customer 2' in accordance with the present system is obtained by the formula (6).

$$C((h_H+h_L)/2)\times(h_H-h_0)\times W_4' \qquad (6)$$

The condition generating the advantage for the customer 2' can be given by the following formula (7).

$$C((h_H+h_L)/2)\times(h_H-h_L)\times\times W_4'<C((h_H+h_0)/2)\times(h_H-h_0)\times W_4' \qquad (7)$$

In this case, the formula (7) can be changed to the following formula (9) by employing the relation expressed in the following formula (8).

$$h_A=(h_H+h_L)/2C_0=C((h_H+h_0)/2) \qquad (8)$$

$$C(h_A)<C_0(h_H-h_0)/(2h_H-2h_A) \qquad (9)$$

For the purpose of more generally expressing, the formula can be normalized employing the formula (10).

$$x=(h_A-h_0)/(h_H-h_0) \qquad (10)$$

That is the following formula (11) can be obtained as a condition for generating the advantage for the customer 2' by redefining the function C as a function of x.

$$C(x)/C_0<0.5/(1-x) \qquad (11)$$

As is known from FIG. 2, x in the customer 2' supplying at $h_H$ becomes always equal to or more than 0.5, and x in the customer 2" supplied at a lower enthalpy than $h_H$ and using to the level ho becomes always equal to or less than 0.5. Accordingly, if it is set so that the formula (11) is satisfied when x is equal to or more than 0.5 and $C(x)/C_0$ becomes smaller than 1 when x is equal to or less than 0.5, the advantage can be generated for both of the customers.

Figure 3:
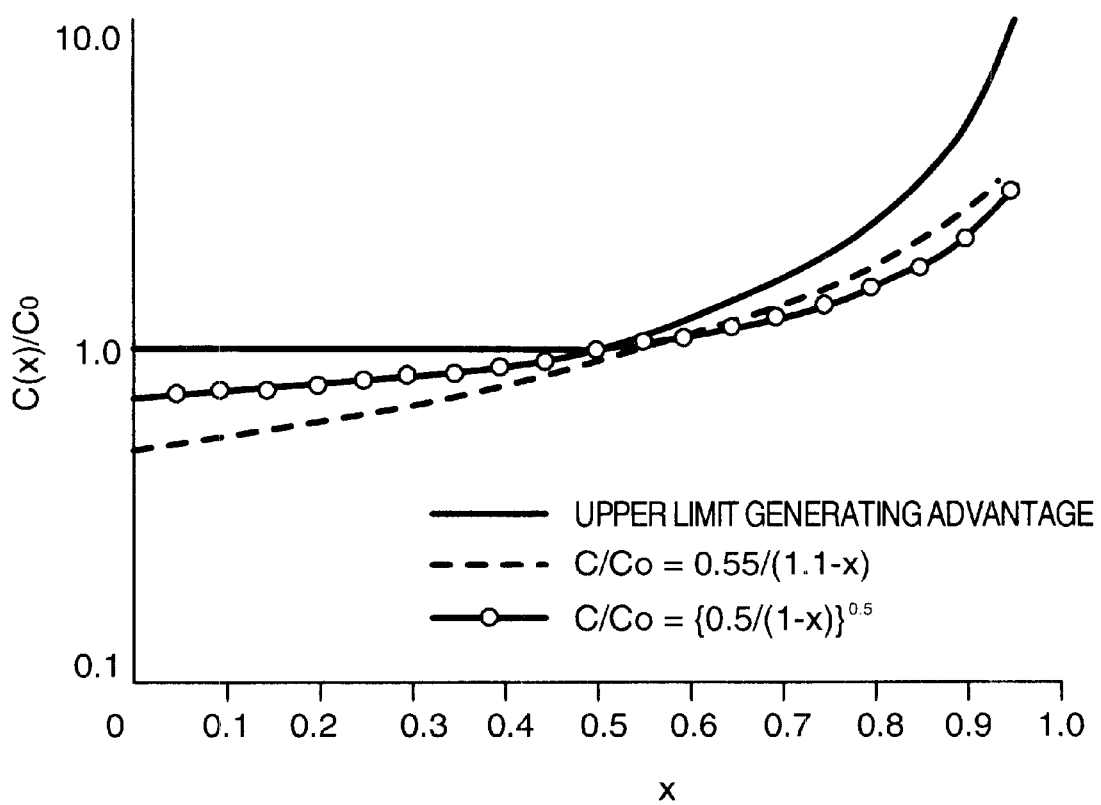
FIG. 3 is a view showing a relation of a relative value between an amount of heat and a unit cost with respect to a normalized average specific enthalpy in accordance with the present invention.

FIG. 3 shows an example of $C(x)/C_0$ mentioned above in comparison with an upper limit generating the advantage. One is the following formula (12).

$$C(x)/C_0=0.55/(1.1-x) \qquad (12)$$

Another is the case that a is set to 0.5 in the formula (13).

$$C(x)/C_0\{0.5/(1-x)\}^\alpha \qquad (13)$$

In the case of the formula (13), the prices paid by the customers 2' and 2" are estimated. With respect to the discharging specific enthalpy of the customer 2', the same normalization of the formula (14) as that of $h_A$ is applied.

$$y=(h_L-h_0)/(h_H-h_0) \qquad (14)$$

Accordingly, with respect to the customer 2', the formula (15) is obtained.

$$X_2'=(1+y)/2 \qquad (15)$$

A ratio $r_2'$ of the cost in accordance with the present system with respect to the cost paid by the customer 2' in the case of the conventional system is expressed by the formula (16).

$$r_2' = (\text{formula 6})/(\text{formula 5}) \qquad (16)$$

$$= \{0.5/(1-x_2')\}^{0.5}(1-y)$$

On the contrary, with respect to the customer 2", when it is assumed that the customer 2" buys the heat in the state of the specific enthalpy of the medium discharged by the customer 2', the following formula (17) is obtained.

$$X_2''=y/2 \qquad (17)$$

When it is assumed that the amount of heat bought by the customer 2" is the same as that of the conventional system, the following formula (18) can be obtained since the ratio of the prices is equal to the ratio of the unit values.

$$r_2''=\{0.5/(1-X_2'')\}^{0.5} \qquad (18)$$

When it is assumed that all of the amount of heat discharged by the customer 2' is sold to the customer 2", the sold total is obtained by the following formula (19).

$$\{0.5/(1-x_2')\}^{0.5}C_0(h_H-h_L)W_4'+\{0.5/(1-x_2'')\}^{0.5}C_0(h_L-h_0)W_4' \qquad (19)$$

A ratio $r_T$ of a selling price per a generated heat amount with respect to a selling price $C_0(h_H-h_0)W_4'$ in the case of selling the generated heat amount $(h_H-h_0)$ required therefor on the basis of the conventional unit value $C_0$ is obtained by the formula (20).

$$r_T=\{0.5/(1-x_2')\}^{0.5}(1-y)+\{0.5/(1-x_2'')\}^{0.5}y \qquad (20)$$

Figure 4:
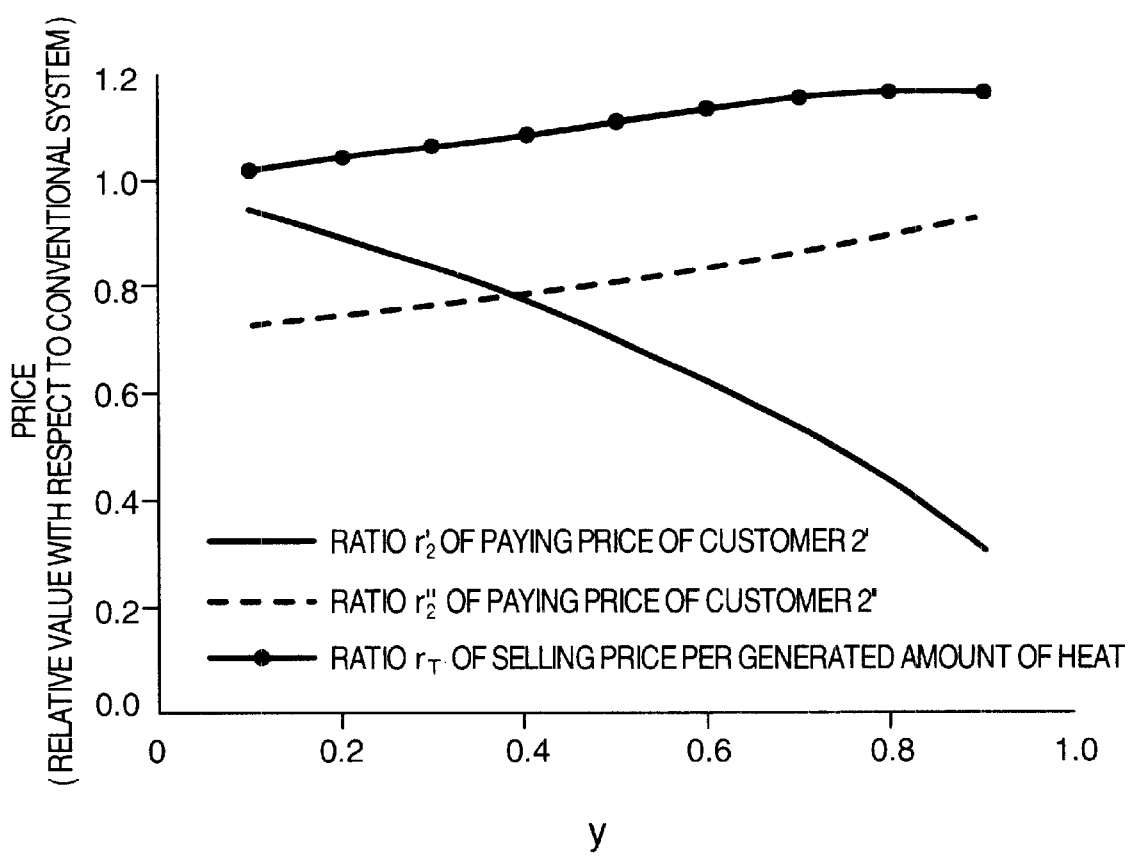
FIG. 4 is a view of a relative value of a paying price of a customer in accordance with the present invention with respect to a conventional system.

Results calculated in accordance with the formulas (16), (18) and (20) are shown in FIG. 4.

In both of the customers 2' and 2", the ratio of the price $C(x)/C_0$ in accordance with the present system with respect to the price in accordance with the conventional system is equal to or less than 1, the paid price is reduced in comparison with the conventional one, however, the selling price per the generated heat amount is increased. This is because the heat discharged by the customer 2' is conventionally wasted and it is necessary to independently generate the heat for the customer 2", on the contrary, in accordance with the present case, only the heat amount conventionally generated for the customer 2' can correspond to both of the customers.

In this case, with respect to the customer in which $W_4''$ is smaller than $W_4'$ in the formula 2, since a part of the heat medium is not recovered, with respect to the portion corresponding to the amount of flow $W_4''$, the unit value of the amount of heat is calculated on the basis of the arithmetic average of the specific enthalpy between the inlet port and the outlet port, however, with respect to the amount of heat in the portion corresponding to $(W_4'-W_4'')$, it is reasonable to employ the unit value calculated on the basis of the arithmetic average of the specific enthalpy between the inlet port and the normal temperature and normal pressure.

Figure 5:
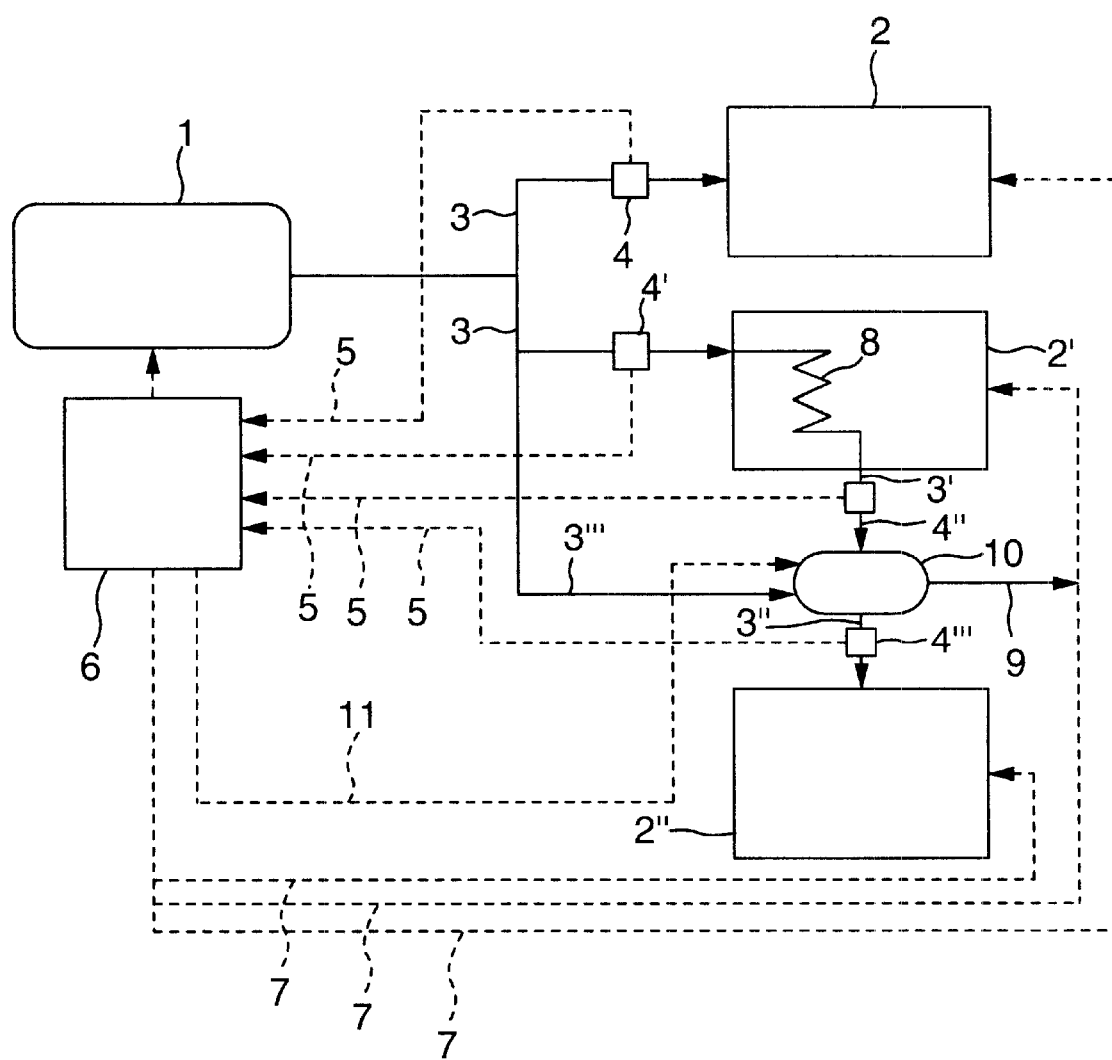
FIG. 5 is a schematic view of a second embodiment in accordance with the present invention.

FIG. 5 shows a second embodiment in accordance with the present invention. The present embodiment is characterized in that a temperature and heat amount adjusting apparatus 10 is provided for the purpose of corresponding to a case that a temperature, a pressure or an amount of heat of a heat medium discharged from the customer 2' is different from a temperature, a pressure or an amount of heat required for the customer 2", thereby coinciding with the temperature, the pressure and the amount of heat required for the customer 2" by using a communicating means 11 by the measurement control apparatus 6.

The temperature and heat amount adjusting apparatus 10 mixes the high temperature heat medium fed from a pipe 3''' in the case that the temperature of the heat medium discharged from the customer 2' is lower than a necessary amount or in the case that the amount of heat is insufficient, thereby adjusting the temperature, the amount of heat and the like. Further, the temperature and heat amount adjusting apparatus 10 may be provided with a function of burning the fuel so as to heat the heat medium or a function of heating the heat medium by an electric heater.

On the other hand, in the case that the temperature and the pressure of the heat medium discharged from the customer 2' are higher than the temperature and the pressure required by the customer 2", the structure is made such that the temperature is reduced by mixing the low temperature heat medium or reducing the pressure by a pressure reducing valve. Accordingly, it is possible to prevent the equipment of the customer 2" from being damaged by the heat medium having the higher temperature and pressure than those expected by the customer 2" and prevent a disaster from being generated. Further, a pipe 3" extending from the temperature and heat amount adjusting apparatus 10 to the customer 2" can employ a pipe having a lower temperature and lower pressure resistance in comparison with the pipes 3 and 3' extending from the heat supply apparatus 1 to the customer 2 and the customer 2', so that it is possible to reduce a piping cost.

Further, in the case that the temperature and the pressure required by the customer 2' are not frequently changed, the temperature, the pressure and the amount of heat of the heat medium fed to the customer 2" may be controlled to the previously set temperature and pressure by a control unit (not shown) placed within the temperature and heat amount adjusting apparatus 10 in place of the measurement control apparatus 6.

Figure 6:
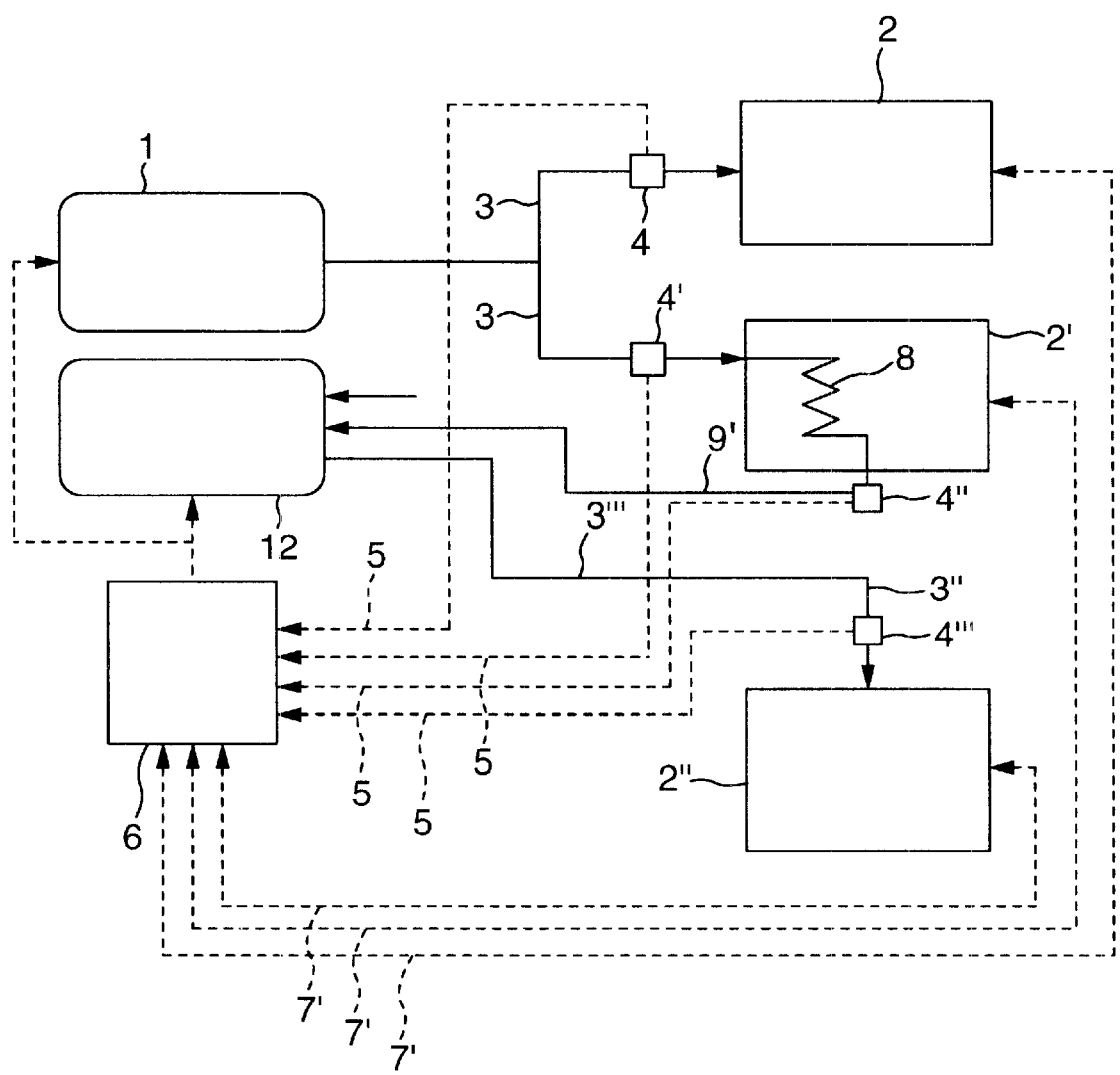
FIG. 6 is a schematic view of a third embodiment in accordance with the present invention.

FIG. 6 shows a third embodiment in accordance with the present invention. The present embodiment is characterized in that a low temperature heat supply apparatus 12 is provided independent from the heat supply apparatus 1 so as to return the heat medium discharged from the customer 2' to the low temperature heat supply apparatus 12 by a pipe 9'.

The low temperature heat supply apparatus 12 increases a temperature by mixing with the high temperature heat medium supplied from the heat supply apparatus 1, by burning the fuel, by an electric heater or the like or reduces the temperature by mixing with the low temperature heat medium so as to adjust the temperature, and adjusts a pressure by a pump or the like.

In the case of the second embodiment shown in FIG. 5, a plurality of apparatuses for adjusting the temperature and the pressure are required in correspondence to the number of the customers, and it is necessary to feed the high temperature heat medium to the temperature and heat amount adjusting apparatus 10 by the pipe 3''', however, in accordance with the present embodiment, there is an advantage that only one apparatus for adjusting the temperature and the pressure is sufficient and it is not necessary to feed the high temperature heat medium far away. In the case that the heat medium returned from the customer is not proper for feeding to the other customer due to a contamination or the like, it is possible to supply the heat medium with no contamination to the customer by transmitting the heat to the new heat medium by a heat exchange.

Figure 7:
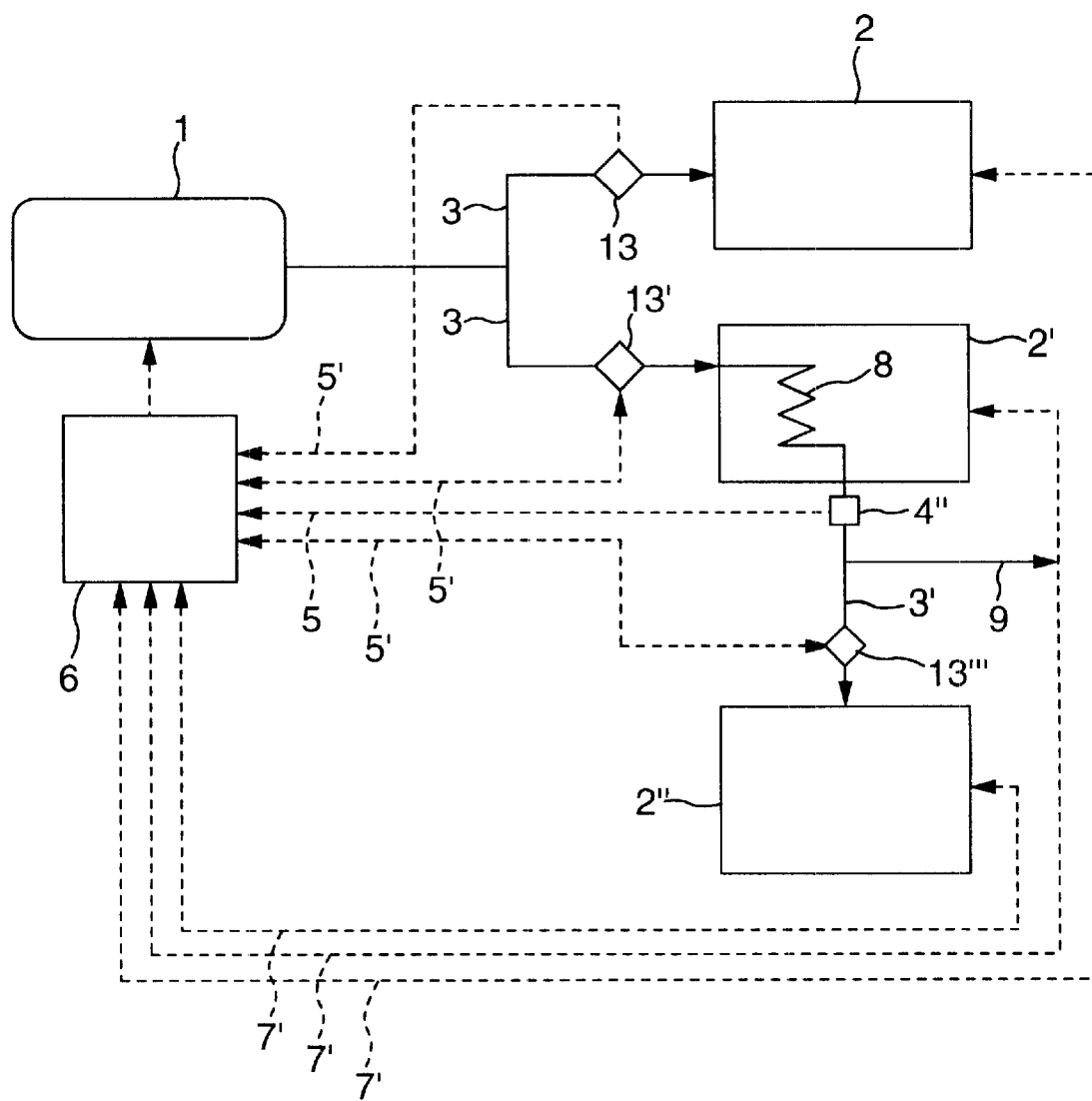
FIG. 7 is a schematic view of a fourth embodiment in accordance with the present invention.

FIG. 7 shows a fourth embodiment in accordance with the present invention. The first to third embodiments correspond to an aspect for supplying the heat medium having a certain temperature and pressure to the customer, however, the present embodiment shows an aspect for maintaining the temperature of a certain equipment at a temperature or a temperature and pressure indicated by the customer for a predetermined time in correspondence to a need of the customer.

In the present embodiment, controllers 13, 13' and 13" for the temperature, the pressure and the amount of flow are placed. The measurement control apparatus 6 receives the measured values of the temperature and the pressure in the equipment of the customer by a communicating means 7', and transmits the measured values to the controllers 13, 13' and 13" via the communicating means 5'. The controllers 13, 13' and 13" control so as to maintain the temperature of the equipment at a predetermined temperature or a predetermined temperature and pressure for a predetermined time.

Accordingly, in the case that the need of the customer is to intend to maintain the temperature of the certain equipment at the predetermined temperature or the predetermined temperature and pressure for the predetermined time, it is possible to directly achieve the object of the customer and it is not necessary to control in the side of the customer.

Figure 8:
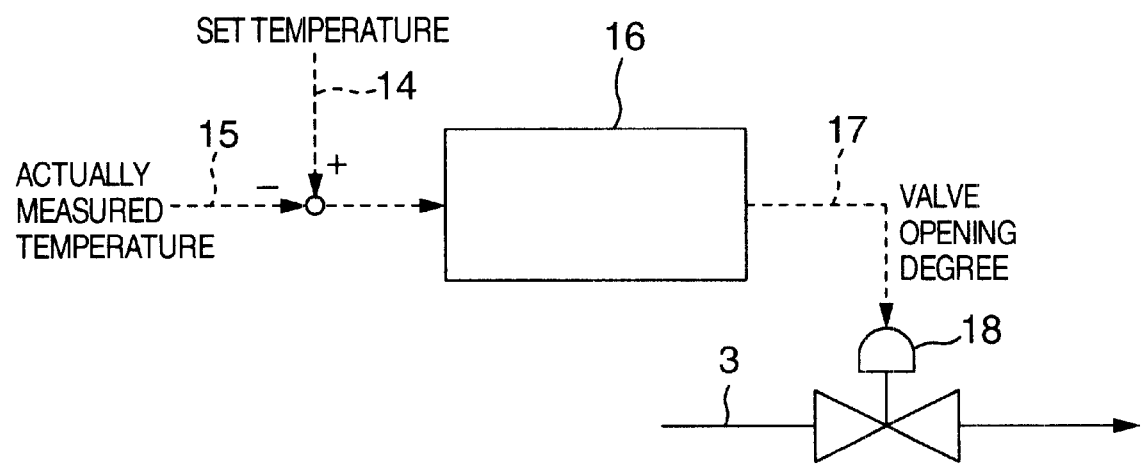
FIG. 8 is a view showing an example of a logic of a temperature control in accordance with the present invention.

FIG. 8 shows an example of the controllers 13, 13' and 13". A difference between a set temperature signal 14 corresponding to the need of the customer and a measured (actually measured) temperature signal 15 output from the measurement control apparatus 6 is input to a transfer element 16, the transfer element 16 outputs a signal in correspondence to the difference, that is, a signal of making an opening degree uniform when the difference is 0, increasing the opening degree when the difference is positive and reducing the opening degree when the difference is negative. An electrically operated valve 18 opens and closes in response to an opening degree signal 17. Accordingly, when the measured temperature 15 is lower than the set temperature 14, the electrically operated valve 18 is opened more and the high temperature heat medium flows at a large amount so as to increase the temperature, and when the measured temperature 15 is higher, the valve is closed so as to reduce the amount of flow and reduce the temperature.

In this case, the need of the customer is set to the temperature of the heat medium, however, it goes without saying that the pressure of the amount of flow may be employed.

In this case, FIG. 7 is illustrated on the basis of the first embodiment, however, the same control can be executed in the second or third embodiment.

As mentioned above, in accordance with the present invention, it is possible to effectively utilize the heat medium without wasting the heat of the heat medium becoming equal to or less than the temperature range or the temperature and pressure range required by the customer, by recovering the heat medium after being used by the customer requiring the heat having the high temperature range so as to use as the heat source for supplying the heat to the customer requiring the heat having the lower temperature range.

Further, it is possible to reflect the reduction of the consumed amount of the heat medium on the price by comprehending the amount of heat used by the customer and recovering the heat medium.

Further, it is possible to supply the heat to the customer requiring only the heat in the high temperature side or the high temperature and high pressure side and the customer requiring only the heat in the low temperature side, at the less expensive price in comparison with the case that the heat is supplied by the conventional system.

Further, it is possible to supply the heat medium having a stable temperature condition to the customer feeding the recovered heat medium by adjusting the temperature of the heat medium supplied to the customer.

Further, it is possible to reduce the number of the equipment for producing the heat medium toward the customer in which the used temperature is low, by using the heat contained in the heat medium recovered by the customer.

Further, in the case of maintaining the temperature of the certain equipment at the predetermined temperature for the predetermined time in correspondence to the need of the customer, the object of the customer can be more directly achieved, and it is possible to make the control in the customer side unnecessary.

What is claimed is:

1. A heat supply system producing a heat medium having a higher temperature than a normal temperature or having higher temperature and pressure than a normal temperature and a normal pressure so as to feed to a plurality of customers, thereby getting a price from said customers, wherein a part or all of the heat medium after at least one customer has used the heat medium is recovered, and a part or all of the heat contained in the recovered heat medium is used as at least a part of a heat source of the heat medium for supplying to a different customer from said one customer;

said system further comprising means for measuring a first value of a temperature and an amount of flow of the heat medium supplied to said one customer and a second value of a temperature and an amount of flow of the heat medium discharged and recovered from said one customer, means for calculating a price of the heat medium to said one customer on the basis of a difference between said first and second values, and means for notifying said price to said one customer; and wherein said means for calculating the price sets a unit price of an amount of heat to be higher in accordance that an arithmetic average between a specific enthalpy (h) of the heat medium supplied to said one customer and a specific enthalpy ($h_L$) of the heat medium discharged from said one customer is higher, with respect to said one customer from which the heat medium is recovered, and sets the unit price of the amount of heat to be higher in accordance that an arithmetic average between a specific enthalpy (h) of the heat medium supplied to said one customer and a specific enthalpy ($h_O$) of the medium at normal temperature and normal pressure is higher, with respect to said different customer recovering no heat medium.

2. A heat supply system as claimed in claim 1, wherein said system further comprises means for adjusting a temperature of a heat medium recovered from said one customer or a heat medium supplied to said different customer.

3. A heat supply system as claimed in claim 1, wherein said system further comprises means for producing a heat medium having a higher temperature than a normal temperature or higher temperature and pressure than a normal temperature and a normal pressure, and wherein a heat contained in the heat medium recovered from said one customer is used as at least one heat source.

4. A heat supply system as claimed in claim 1, wherein said system further comprises means for controlling said temperature, pressure or amount of flow on the basis of an actually measured value of the temperature, pressure or amount of flow of the heat medium fed to said one customer and a set value in correspondence to a need of said one customer.

\* \* \* \* \*